United States Patent [19]

O'Connor

[11] 3,945,208

[45] Mar. 23, 1976

[54] FILTRATION FOR INTEGRATED TRACTOR HYDRAULIC SYSTEM

[75] Inventor: John W. O'Connor, Hales Corners, Wis.

[73] Assignee: Allis-Chalmers Corporation, Milwaukee, Wis.

[22] Filed: Jan. 2, 1974

[21] Appl. No.: 429,780

[52] U.S. Cl. ..................... 60/420; 60/453; 60/484; 60/486; 210/167; 210/171; 210/172

[51] Int. Cl.² ..................... F16D 31/04

[58] Field of Search ............ 60/420, 421, 484, 486, 60/453; 184/6.24; 210/167, 168, 171, 257, 258, 172

[56] References Cited

UNITED STATES PATENTS

| | | | |
|---|---|---|---|
| 2,302,552 | 11/1942 | Johnson | 210/60 X |
| 2,309,983 | 2/1943 | Riddle | 60/421 X |
| 2,425,700 | 8/1947 | Le Clair | 184/6.24 |
| 2,767,736 | 10/1956 | Lackinger | 210/168 X |
| 2,979,160 | 4/1961 | Haas | 210/168 X |
| 3,455,457 | 7/1969 | Popelar | 210/168 |
| 3,507,125 | 4/1970 | Vaughan et al. | 60/484 X |
| 3,646,596 | 2/1972 | Bauer | 60/486 X |
| 3,859,790 | 1/1975 | Bacquie et al. | 60/486 X |

*Primary Examiner*—John Adee
*Assistant Examiner*—Robert G. Mukal
*Attorney, Agent, or Firm*—Arthur L. Nelson

[57] ABSTRACT

A hydraulic filtering and reservoir means to accommodate changing rates of hydraulic fluid flow through a variable displacement pump. A constant displacement pump and a variable displacement pump are used in the system to provide filtered pressurized fluid for hydraulic motors.

10 Claims, 1 Drawing Figure

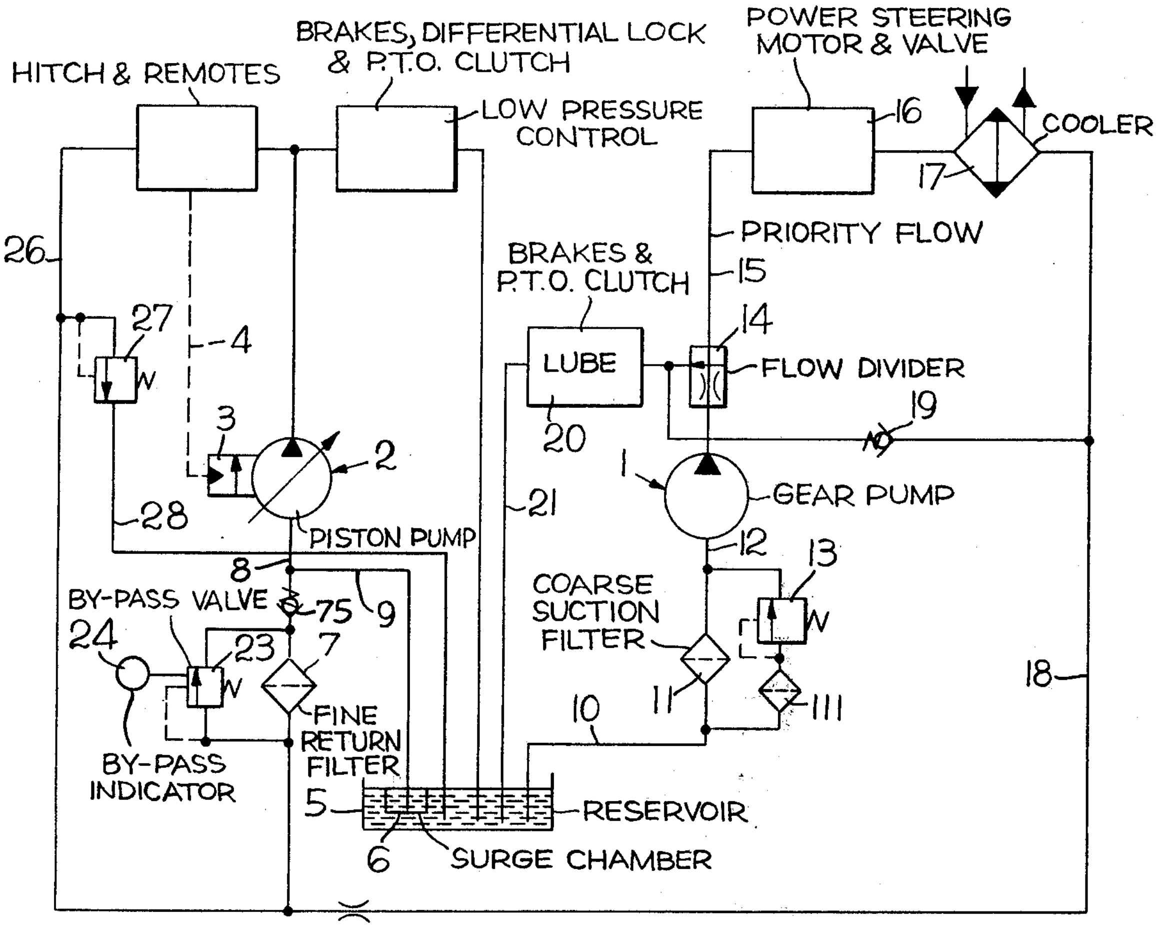
HITCH & REMOTES
BRAKES, DIFFERENTIAL LOCK & P.T.O. CLUTCH
LOW PRESSURE CONTROL
POWER STEERING MOTOR & VALVE
16
COOLER
17
26
27
4
3
2
PRIORITY FLOW
15
BRAKES & P.T.O. CLUTCH
LUBE
14
FLOW DIVIDER
19
20
1
GEAR PUMP
21
28
PISTON PUMP
8
9
12
13
BY-PASS VALVE
75
COARSE SUCTION FILTER
24
23
7
FINE RETURN FILTER
11
111
18
10
BY-PASS INDICATOR
5
RESERVOIR
6
SURGE CHAMBER

FILTRATION FOR INTEGRATED TRACTOR HYDRAULIC SYSTEM

This invention relates to a hydraulic system and more particularly to filtering means with a hydraulic fluid reservoir to avoid cavitation of the pump and fluid hammering as the flow rate of the variable displacement pump is varied.

A large modern tractor has hydraulically actuated brakes and clutches and forced lubrication of brakes, clutches, bearings and gears. The hydraulic fluid used is often the power train lubricant fluid and the reservoir is the rear axle housing. In using a load-sensitive hydraulic system operating in this manner, a problem of reliability is presented. Commercially available hydraulic components require fluid cleanliness levels not usually associated with the tractor power train reservoirs. Accordingly, this invention provides a filtering system which was developed to protect dirt sensitive hydraulic components from the power train generated contaminants.

The filtering system provides single stage filtration of all hydraulic components and two stage filtration for the piston pump charge oil. In this manner, the piston pump is protected from contamination which could enter from the remote couplers, cylinders or motors. The piston pump is supplied with a charge oil from the return line of the piston pump and also from a gear pump which has a coarse filter in its suction side. A surge tank is connected to the main reservoir and dissipates the energy of fluid deceleration of the piston pump inlet flow when the pump rapidly destrokes and provides an alternate source of clean change oil for the piston pump when inlet demand exceeds return flow from the piston pump and gear pump.

A suction filter which is a coarse filter, filters fluid to the gear pump and protects all hydraulic components with nominal 12 micron filtration. This protects all components from contaminants generated by the power train reservoir. The hydraulic fluid from the gear pump is returned through the fluid return filter which is the second stage filtering at piston pump inlet. The return flow filter is a fine filter of approximately 5 microns which protects the charge fluid to the piston pump. A bypass valve is provided with a bypass indicator to provide an indication to the operator that the bypass valve is in operation. The charge fluid for the piston pump can also be partially supplied from the surge tank to avoid cavitation when the pump stroke is increased.

It is an object of this invention to provide a surge tank in a hydraulic system to accommodate variations in the flow rate in all portions of the load-sensitive closed center hydraulic system.

It is another object of this invention to provide double filtering means and means to accommodate variable flow rate to a variable displacement pump in a hydraulic system.

It is a further object of this invention to provide suction and return line filters in a hydraulic system and a reservoir means to accommodate variation in flow rates to a variable displacement pump.

The objects of this invention are accomplished in an integrated hydraulic system wherein a constant displacement pump, preferably a gear pump, provides pressurized fluid for the power steering of the vehicle. A flow divider valve provides priority flow to the power steering and secondary flow for lubrication of the brakes, a power takeoff clutch and then return to the reservoir. A power steering motor provides continuous flow of hydraulic fluid through the power steering motor or valving means and is returned through a return flow filter. The constant displacement pump is supplied with hydraulic fluid from the reservoir through a coarse filter in the suction line.

The secondary filter is a fine filter of approximately 5 microns filtering capability which charges the variable displacement pump, preferably a piston pump. The variable displacement pump is connected to a surge tank in the reservoir. The variable displacement pump supplies pressurized hydraulic fluid to the hitch control ram and the low pressure control hydraulic actuators such as the brakes, the differential lock and the power takeoff clutches. The hitch and remote hydraulic actuators return fluid through the fine filter to the charging side of the variable displacement pump.

The two pumps one in each of the two circuits of the hydraulic system are integrated into one system in which the main reservoir supplies the hydraulic fluid for both pumps. The integrated hydraulic system provides common fluid for operating all the hydraulic functions and a filtering system to maintain long life of the hydraulic components in the system.

The preferred embodiment of this invention is illustrated in the attached drawing. The drawing illustrates schematically the integrated hydraulic fluid system.

Referring to the drawing, the hydraulic fluid system is illustrated. The system includes a constant displacement pump 1 such as a gear pump in one circuit which provides constant displacement at a given engine speed. A variable displacement pump 2 is shown in the other circuit of a hydraulic system. The variable displacement pump is more commonly a piston pump with a variable swash plate to control the displacement of the pump. A compensator 3 which is pressure responsive varies the angle of the swash plate of the displacement of the pump in response to pressure in the hydraulic system through the pilot line 4.

A reservoir 5 is preferably located in the rear axle housing. A surge tank 6 provides a source of fluid free from contamination to assure long life of the hydraulic components in the system. The surge tank 6 is positioned in communication with reservoir 5 which normally receives fluid from the hydraulic circuit subsequent to filtering in the return filter 7. The surge tank 6 is connected to the inlet conduit 8 for the variable displacement pump 2 through the conduit 9 to accommodate variations of flow in the charging fluid of the variable displacement pump 2.

The power steering circuit includes the gear pump 1 which receives hydraulic fluid through the conduit 10 from the reservoir 5. The gear pump draws fluid through the suction filter 11 which is a coarse filter of approximately 12 microns filtration and supplies fluid to inlet conduit 12. Bypass valve 13 and auxiliary filter 111 assure a supply of fluid to the gear pump 1 in the event of excessive restriction to flow through the filter 11.

The gear pump 1 pressurizes fluid which is supplied to the flow divider valve 14 which provides priority flow to the conduit 15 connected to the power steering motor 16. The power steering motor includes means for continuous flow of pressurized fluid through the motor 16 and valve means from the gear pump 1. The continuous flow of fluid passes through the cooler 17 to the return line 18 to the filter 7. The check valve 19 permits flow from the conduit 18 for lubrication of the brakes and the power takeoff clutch through the lubrication circuit 20 at low engine speed when secondary flow is low. The flow divider 14 also diverts a portion of the fluid through the lubrication circuit 20 to the return line 21 to the main reservoir 5.

The hitch control circuit which includes the hydraulic actuators for the hitch, brakes, differential lock and the power takeoff clutch are operated through the variable displacement pump 2. The variable displacement pump 2 receives fluid through the return filter 7 which is a fine filter approximately 5 microns filtering capacity. The fluid for charging the variable displacement pump is returned through the filter 7 and check valve 75. A bypass valve 23 assures a fluid supply to the pump in the event of filter failure. A bypass indicator 24 associated with the bypass valve 23 indicates to the operator that the filter is defective. The surge chamber 6 assures a source of hydraulic fluid to prevent cavitation of the variable displacement pump 2.

The variable displacement pump 2 pressurizes fluid for operating the brakes on the vehicle, a differential lock through a hydraulic clutch on the differential of the tractor and for operating the power takeoff clutch. Pressurized fluid passing through the brake, differential lock and power takeoff clutch are returned to the reservoir 5.

The hydraulic actuators in the three-point hitch and any remote hydraulic actuators such as hydraulic lifts on the implement are operated from this circuit. The pressures for these operations are controlled by the pilot line 4 which operates the compensator in the variable displacement pump 2.

Return fluid from the three-point hitch is returned to the conduit 26 which in turn supplies charging fluid to the filter 7 for recirculation through the variable displacement pump 2. Excessive fluid can be returned to the bypass valve 27 and conduit 28 to the reservoir 5. The operation of the integrated hydraulic fluid system will be described in the following paragraphs.

The hydraulic fluid system illustrated in the drawings includes a power steering circuit having a constant displacement pump 1. The constant displacement pump 1 receives hydraulic fluid from the reservoir 5 which is drawn through the suction filter 11. The pressurized fluid flows through the flow divider 14 with priority flowing to the power steering unit. The fluid is transmitted through the power steering motor and through the cooler 17 and returned through the return filter 7. The power steering motor is constructed in such a manner that the fluid constantly flows through the power steering servomotor or valve means. Reference may be had to a hydraulic steering circuit similar to that shown in the drawings but in more detail as shown in the U.S. Pat. No. 3,528,521, Hydraulic Steering System by H. P. Ellis. Return flow of the hydraulic fluid from the power steering system goes through the cooler 17 and returns through the return filter 7 to charge the variable displacement pump 2.

The flow divider 14 supplies fluid for lubrication of the brakes and power takeoff clutch and is returned directly to the reservoir 5.

The variable displacement pump 2 is supplied with hydraulic fluid from the conduit 8 receiving fluid from the filter 7. The variable displacement pump 2 can be charged with fluid from the surge tank 6 to avoid cavitation while in operation. Normally, however, no fluid is required from the surge tank 6 and only in extreme cases would fluid be drawn from the surge tank 6 to avoid cavitation of the pump 2.

The return filter 7 is a fine filter which eliminates any contamination in the hydraulic fluid to assure long life of the variable displacement pump 2. When the filter 7 is loaded with contamination and is inoperative, the bypass valve 23 will open which in turn will activate a bypass indicator 24 to indicate to the operator that hydraulic filter 7 is not properly operating.

The surge tank 6 stores excess fluid returning to the pump 2 on the return side of the circuit. The energy of the decelerating fluid is dissipated as it reaches the surge tank 6. The variable displacement pump supplies fluid to the three-point hitch hydraulic actuator and any remote hydraulic actuators in this circuit. The hydraulic fluid returns through the return conduit 26 and is returned through the return filter 7. Excessive fluid, however, can be directly returned through the relief valve 27 and conduit 28 to the reservoir 5.

Reference may be had to a Filter Bypass Indicator as shown in U.S. Pat. No. 3,644,915, James R. McBurnett. Reference may also be had to a flow divider valve with priority flow control to the steering unit in the U.S. Pat. No. 3,597,921, James R. McBurnett, Priority Flow Control Valve.

The embodiments of the invention in which an exclusive property or privilege is claimed are defined as follows:

1. A hydraulic system including, a fluid reservoir, a constant displacement pump, a fluid supply filter connected between the low pressure side of said constant displacement pump and said reservoir, at least one hydraulic fluid motor connected to the high pressure side of said constant displacement pump, a variable displacement pump including a pressure compensator, at least one hydraulic fluid actuator connected to the high pressure side of said variable displacement pump, means connecting said pressure compensator to said hydraulic fluid actuator to vary the displacement of said variable displacement pump responsive to load pressures on said hydraulic fluid actuator, a fluid return filter connected on one side to the return side of said hydraulic fluid motor and to the return side of said hydraulic fluid actuator and on the other side to the low pressure side of said variable displacement pump for filtering returned hydraulic fluid supplied to said variable displacement pump, a surge tank in communication with said fluid reservoir, a hydraulic conduit means connected to said surge tank and connected between said return filter and said variable displacement pump to provide a filtered reserve supply of hydraulic fluid to compensate for variations of flow rate between said return filter and said variable displacement pump.

2. A hydraulic system as set forth in claim 1 including a relief valve connected between the return side of said hydraulic fluid actuator and said reservoir.

3. A hydraulic system as set forth in claim 1 including a bypass valve bypassing said return filter to prevent cavitation of said variable displacement pump in the event of defective operation of said return filter.

4. A hydraulic system as set forth in claim 1 wherein said return filter includes a filtering means of finer porosity as compared to said supply filter.

5. A hydraulic system as set forth in claim 1 including a fluid cooler connected between the return side of said hydraulic fluid motor and the low pressure side of said variable displacement pump for cooling fluid from said constant displacement pump for cooling fluid in said hydraulic system.

6. A hydraulic system as set forth in claim 1 including a bypass valve and an auxiliary filter connected in parallel arrangement with said fluid supply filter between said constant displacement pump and said reservoir.

7. A hydraulic system as set forth in claim 1 wherein said surge tank includes means communicating with said reservoir to allow fluid from said surge tank to flow into the said reservoir.

8. A hydraulic system as set forth in claim 1 including a check valve connected between said fluid return filter and the low pressure side of said variable displacement pump permitting unidirectional flow from said filter to said variable displacement pump.

9. A hydraulic system as set forth in claim 1 wherein said constant displacement pump includes a gear pump.

10. A hydraulic system as set forth in claim 1 wherein said variable displacement pump includes a piston pump.

* * * * *